United States Patent
Rangan et al.

(10) Patent No.: US 8,208,497 B2
(45) Date of Patent: Jun. 26, 2012

(54) TIME STAMPED PACKET DATA INTERFACE BETWEEN A MODEM AND AN RF UNIT

(75) Inventors: Sundeep Rangan, Jersey City, NJ (US); Frank Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 12/339,462

(22) Filed: Dec. 19, 2008

(65) Prior Publication Data

US 2009/0170430 A1 Jul. 2, 2009

Related U.S. Application Data

(60) Provisional application No. 61/017,462, filed on Dec. 28, 2007.

(51) Int. Cl.
*H04J 3/06* (2006.01)
(52) U.S. Cl. ........ 370/503; 370/347; 370/470; 370/537; 455/452.2; 455/551; 455/561; 455/422.1; 455/13.2
(58) Field of Classification Search ............... 455/452.2, 455/561, 551, 456.1, 456.6, 422.1, 13.2; 370/347, 350, 395, 503, 537
See application file for complete search history.

(56) References Cited

U.S. PATENT DOCUMENTS

| | | | |
|---|---|---|---|
| 6,347,084 B1 * | 2/2002 | Hulyalkar et al. | 370/347 |
| 6,490,405 B1 * | 12/2002 | Speed et al. | 386/207 |
| 6,510,150 B1 * | 1/2003 | Ngo | 370/347 |
| 7,206,327 B2 * | 4/2007 | Lorek et al. | 370/503 |
| 7,302,269 B1 * | 11/2007 | Crawford et al. | 455/456.1 |
| 7,362,838 B2 * | 4/2008 | Mizukami et al. | 375/362 |
| 7,394,830 B2 * | 7/2008 | Chapman | 370/503 |

(Continued)

FOREIGN PATENT DOCUMENTS

WO WO02067450 A2 8/2002

OTHER PUBLICATIONS

Charles Linn: "Hard Time Meets a Soft World—Management of Time Concepts in Software-Defined Radios" Military Communications Conference, 2007. MILCOM 2007. IEEE, IEEE, Piscataway, NJ, USA, Oct. 29, 2007, pp. 1-7, XP031232927 Orlando, US ISBN: 978-1-4244-1512-0 abstract; figures 3,4 p. 3, right-hand column, paragraph 2—paragraph 3 p. 5, left-hand column, paragraph 2—p. 6, left-hand column, paragraph 2 p. 6, righthand column, paragraph 3.

(Continued)

*Primary Examiner* — Linh Nguyen
(74) *Attorney, Agent, or Firm* — Michelle Gallardo; Nicholas J. Pauley; Jonathan T. Velasco

(57) ABSTRACT

System and method for providing a timestamp packetized data interface between an RF unit and a modem. According to one embodiment, the RF unit receives an inbound RF signal, processes and demodulates the inbound RF signal to generate samples, generates a timestamp indicative of when the inbound RF signal was received, packetizes and multiplexes the samples and the timestamp, and sends the multiplexed stream to the modem. The modem generates received data from the samples. If the received data type requires a response to be sent at a particular time, the modem generates symbols from responsive outbound data, generates a timestamp which indicates when the outbound data is to be transmitted, packetizes and multiplexes the symbols and the timestamp, and sends the multiplexed stream to the RF unit. The RF unit generates an outbound RF signal from the symbols, and transmits the outbound signal in accordance with the timestamp.

40 Claims, 4 Drawing Sheets

U.S. PATENT DOCUMENTS

| | | | | |
|---|---|---|---|---|
| 7,545,794 | B2* | 6/2009 | Loukianov | 370/350 |
| 7,640,019 | B2 | 12/2009 | Conyers et al. | |
| 2004/0109519 | A1* | 6/2004 | Mizukami et al. | 375/362 |
| 2006/0168612 | A1* | 7/2006 | Chapman et al. | 725/11 |
| 2006/0248106 | A1* | 11/2006 | Milne et al. | 707/102 |
| 2008/0039119 | A1* | 2/2008 | Crawford et al. | 455/456.1 |
| 2009/0185574 | A1* | 7/2009 | Chapman et al. | 370/419 |

OTHER PUBLICATIONS

International Search Report & Written Opinion—PCT/US2009/088251, International Search Authority—European Patent Office—Apr. 8, 2009.

Taiwan Search Report—TW097151024—TIPO—Nov. 26, 2011.

* cited by examiner

| Time Stamp 1 | 2048 Samples | Time Stamp 2 | 2048 Samples | Time Stamp 3 | • • • |

| Time Stamp 1 | 2048 Symbols | Time Stamp 2 | 2048 Symbols | Time Stamp 3 | • • • |

TIME STAMPED PACKET DATA INTERFACE BETWEEN A MODEM AND AN RF UNIT

CROSS REFERENCE TO RELATED APPLICATION

This application claims the benefit of the filing date of Provisional Application, Ser. No. 61/017,462, filed on Dec. 28, 2007, and entitled "Time Stamped Packet Data Interface Between a Modem and an RF Unit," which is incorporated herein by reference.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

SUMMARY

An aspect of the disclosure relates to a system and method for providing a timestamp packetized data interface between an RF unit and a modem. According to one embodiment, the RF unit receives an inbound RF signal, processes and demodulates the inbound RF signal to generate samples, generates a timestamp indicative of when the inbound RF signal was received, packetizes and multiplexes the samples and the timestamp, and sends the multiplexed stream to the modem. The modem generates received data from the samples. If the received data type requires a response to be sent at a particular time, the modem generates symbols from responsive outbound data, generates a timestamp which indicates when the outbound data is to be transmitted, packetizes and multiplexes the symbols and the timestamp, and sends the multiplexed stream to the RF unit. The RF unit generates an outbound RF signal from the symbols, and transmits the outbound signal in accordance with the timestamp.

Other aspects, advantages and novel features of the present disclosure will become apparent from the following detailed description when considered in conjunction with the accompanying drawings.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
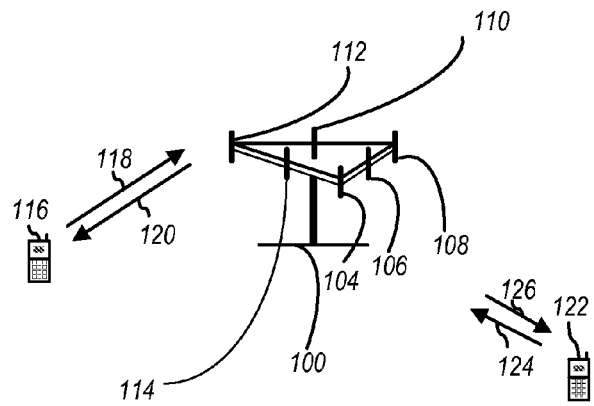
FIG. 1 illustrates a multiple access wireless communication system according to one embodiment of the disclosure.

Referring to FIG. 1, a multiple access wireless communication system according to one embodiment is illustrated. A base station 100 (BS) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the base station. In the embodiment, antenna groups each are designed to communicate to access terminals in a sector of the areas covered by base station 100.

In communication over forward links 120 and 126, the transmitting antennas of base station 100 utilize beamforming in order to improve the signal-to-noise ratio of forward links for the different access terminals 116 and 124. Also, a base station using beamforming to transmit to access terminals scattered randomly through its coverage causes less interference to access terminals in neighboring cells than a base station transmitting through a single antenna to all its access terminals.

A base station may be a fixed station used for communicating with the terminals and may also be referred to as a base station, a Node B, or some other terminology. An access terminal may also be called an access terminal, user equipment (UE), a wireless communication device, terminal, access terminal or some other terminology.

Figure 2:
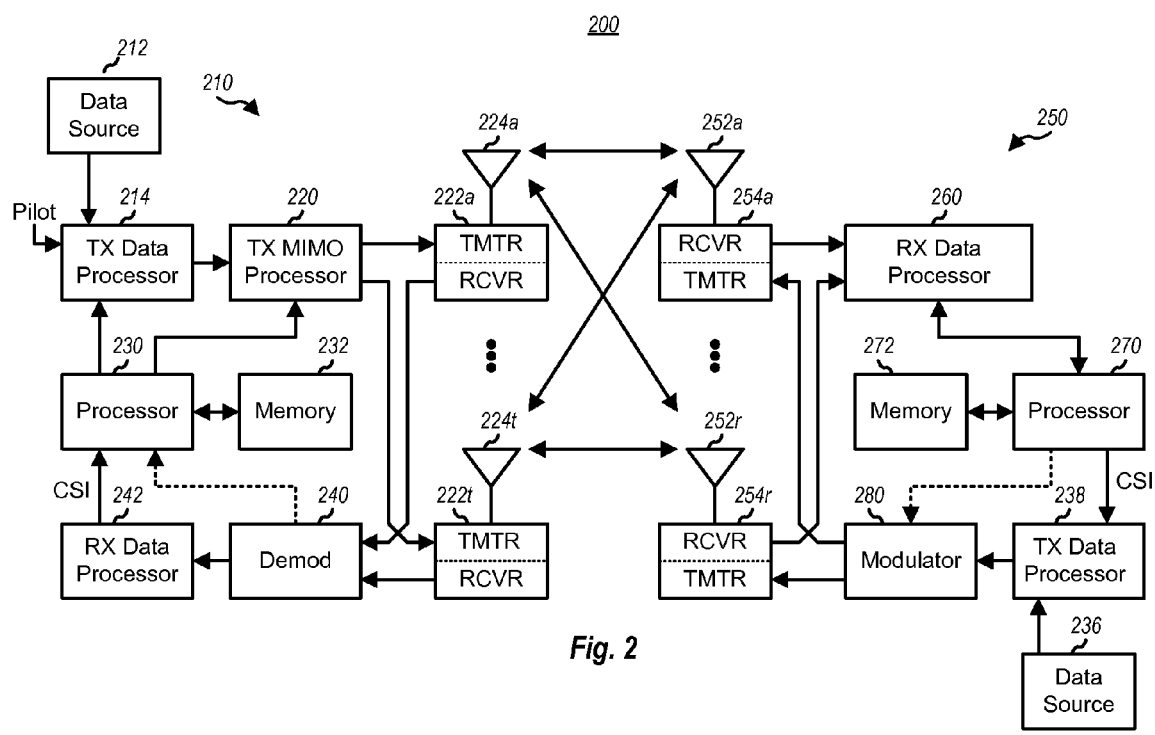
FIG. 2 illustrates a block diagram of an exemplary communication system in accordance with another embodiment of the disclosure.

FIG. 2 is a block diagram of an embodiment of a transmitter system 210 (also known as the base station) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In wireless base stations, it is desirable to provide a simple, standard interface between the digital modem sections of the base station (BS) and the RF sections that transmit and receive data to and from the antennas. With a simple interface, the RF section can be changed easily for different power and spectrum requirements. Also, in a multi-vendor environment, the same digital section can be connected to RF units from different vendors affording greater flexibility in systems integration. The interface must typically send the digital complex samples to be transmitted in the downlink (DL) to the RF, while sending the received uplink (UL) samples from the RF section to the digital modem. Timing information must be communicated somehow to ensure that there is a fixed time relation between the UL and DL data streams if needed. Also, many wireless standards such as 3GPP2 UMB and some versions of 3GPP LTE, disclose that both the UL and DL data streams are synchronized to an absolute time, generally derived from GPS.

The simplest approach for communicating digital data synchronized to an absolute time is to send a separate clock from which the timing can be derived, and then send the data at a fixed time relation to the clock signal. A similar method can also be used to fix the relation between the UL and DL data streams. The main difficulty in this approach is that many modem high-speed data link protocols, such as Ethernet and Serial RapidIO (SRIO), transmit data in packets without fixed timing. Data packets can arrive with significant timing jitter due to variability in the scheduling of the transmission, particularly when the link is shared with multiple communication streams. With such jitter, the data would lose its relation to any clock signal.

Instead, data is transmitted in asynchronous packets along with timestamps. Specifically, data is transmitted in a sequence of packets containing the values for the complex modulation symbols. Interleaved into the stream of data packets are periodic "timestamp" packets. In the RX path, the timestamps provide information on the absolute time at which data packets arrived. In the TX path, the timestamps indicate the time at which the data is to be transmitted over the antenna. The only requirement to synchronize the data to the timestamps is that order is maintained over the link.

This packetized interface works with standard high-speed packet communication standards including Serial Rapid IO (SRIO) and Ethernet. Additionally, RF control messages, such as gating of the power amplifiers PAs and low noise amplifiers LNAs, or gain and frequency control, can be tagged with timestamps to control the precise time at which the commands will take effect. This feature is useful for TDD systems where the transitions between UL and DL ccur at certain times specified in the standard. The following describes an exemplary implementation that incorporates the above concepts.

Figures 3, 4A, 4B:
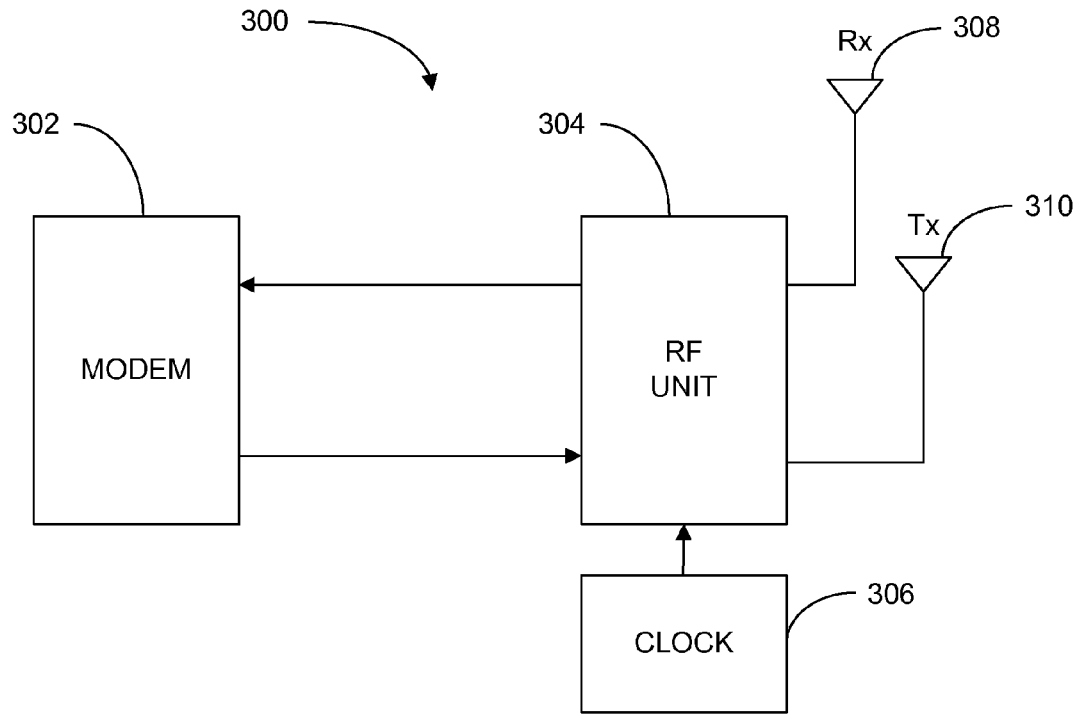
FIG. 3 illustrates a block diagram of another exemplary communication system in accordance with another embodiment of the disclosure.
FIG. 4A illustrates a block diagram of an exemplary inbound data stream including one or more timestamps in accordance with another embodiment of the disclosure.
FIG. 4B illustrates a block diagram of an exemplary outbound data stream including one or more timestamps in accordance with another embodiment of the disclosure.

FIG. 3 illustrates a block diagram of another exemplary communication system 300 in accordance with another embodiment of the disclosure. The communication system 300 comprises a modem 302, an RF unit 304, a clock signal generator 306, a receive antenna 308, and a transmit antenna 310. Although two antennas are illustrated, it shall be understood that a single antenna may be employed and used for both receiving and transmitting signals.

In operation, the RF unit 304 receives an inbound RF signal by way of the receive antenna 308. Upon receiving the inbound RF signal, the RF unit 304 generates a timestamp that corresponds to when the RF signal was initially received. The RF unit 304 uses a clock signal from the clock signal generator 306 to generate the timestamp. The clock signal generator 306 may generate the clock signal based on one or more signals received from one or more global positioning satellites (GPS), or from other different sources. The RF unit 304 then demodulates and processes the inbound signal to generate samples to be decoded by the modem 302. The RF unit 304 then combines the samples with the timestamp, and sends it to the modem for further processing. In one exemplary implementation, the RF unit 304 packetizes and time multiplexes the samples and the timestamp information, as explained in more detail below.

FIG. 4A illustrates a block diagram of an exemplary receive data stream including one or more timestamps in accordance with another embodiment of the disclosure. The receive data stream is an example of a stream generated by the RF unit 304 and sent to the modem 302. As shown, the receive data stream comprises a timestamp preceding a plurality of samples of the inbound signal. For example, Time Stamp 1 precedes the first 2048 samples of the inbound signal, wherein the Time Stamp 1 corresponds to the approximate time that the RF unit 304 received the first sample of the first 2048 samples. Similarly, Time Stamp 2 precedes the second 2048 samples of the inbound signal, wherein the Time Stamp 2 corresponds to the approximate time that the RF unit 304 received the first sample of the second 2048 samples. In the case that the samples are sent at a substantially constant data rate, the modem 302 may then derive the corresponding time of any other sample from the position of the sample within the 2048. It shall be understood that more or less samples (other than 2048 samples) may be situated between timestamps. Additionally, it shall be understood that the timestamp need not correspond to the time at which the first sample of the following set was received, but may correspond to the time in which any sample within the set was received.

Referring back to FIG. 3, the modem 302 receives the samples and timestamps from the RF unit 304, and processes the samples to generate data bits for a data sink (not shown). If the received data is of the type that requires responsive outgoing data (e.g., an acknowledgement (ack) message) to be sent with a predetermined time relationship with respect to when the inbound signal was received, the modem 302 may then add timestamps to the outgoing data symbols, and send it to the RF unit 304 for transmission at the times indicated by the respective timestamps. In one exemplary implementation, the modem 302 packetizes and time multiplexes the outbound symbols with timestamp information, as explained in more detail below.

FIG. 4B illustrates a block diagram of an exemplary transmit data stream including one or more timestamps in accordance with another embodiment of the disclosure. The transmit data stream is an example of a stream generated by the modem 302 and sent to the RF unit 304. As shown, the transmit data stream comprises a timestamp preceding a plurality of symbols of the outbound signal. For example, Time Stamp 1 precedes the first 2048 symbols of the outbound signal, wherein the Time Stamp 1 corresponds to the approximate time that the RF unit 304 is to transmit the first sample of the first 2048 symbols in the form of an outbound RF signal. Similarly, Time Stamp 2 precedes the second 2048 samples of the outbound signal, wherein the Time Stamp 2 corresponds to the approximate time that the RF unit 304 is to transmit the first sample of the second 2048 symbols in the form of an outbound RF signal. In the case that the symbols are to be transmitted at a substantially constant data rate, the RF unit 304 may determine the transmit time for the other 2047 symbols. It shall be understood that more or less samples (other than 2048 samples) may be situated between timestamps. Additionally, it shall be understood that the timestamp need not corresponding to the time at which the first sample of the following set is to be transmitted, but may correspond to the transmission time of any symbol within the set.

Figure 5:
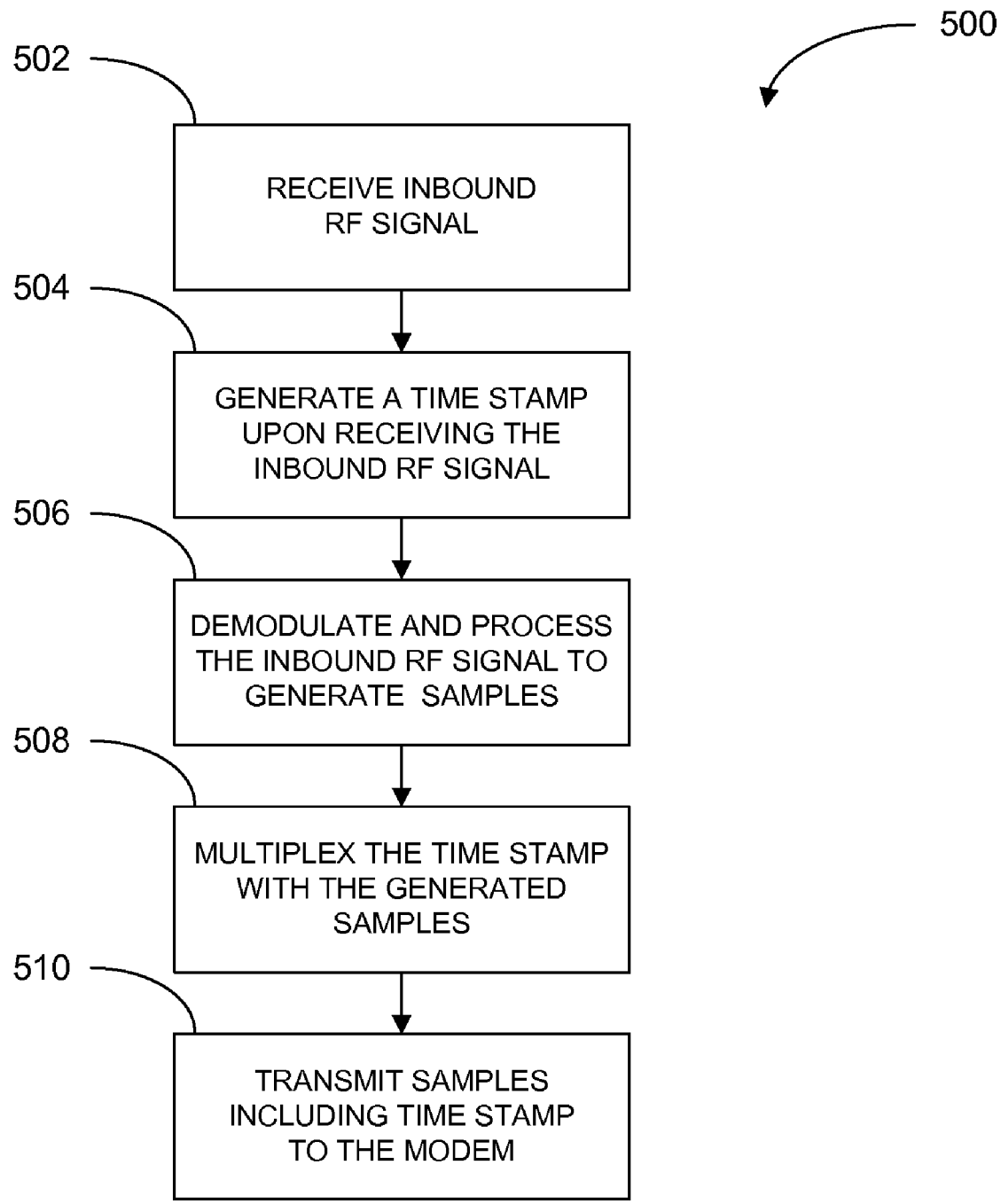
FIG. 5 illustrates a flow diagram of an exemplary method of processing an inbound signal in accordance with another embodiment of the disclosure.

FIG. 5 illustrates a flow diagram of an exemplary method 500 of processing an inbound signal in accordance with another embodiment of the disclosure. The method 500 may be implemented by the RF unit 304 previously discussed. According to the method 500, the RF unit 304 receives the inbound RF signal via the receive antenna 308 (block 502). In response to receiving the inbound RF signal, the RF unit 304 reads the signal generated by the clock generator 306 to generate a timestamp that corresponds to the approximate time that the inbound signal was initially received (block 504). The RF unit 304 also demodulates and processes the inbound RF signal to generate a plurality of samples (block 506). The RF unit 304 then combines or multiplexs (e.g., in the time domain) the generated timestamp and samples (block 508). Then, the RF unit 304 packetizes and sends the samples including the timestamp to the modem 302 for further processing (block 510).

Figure 6:
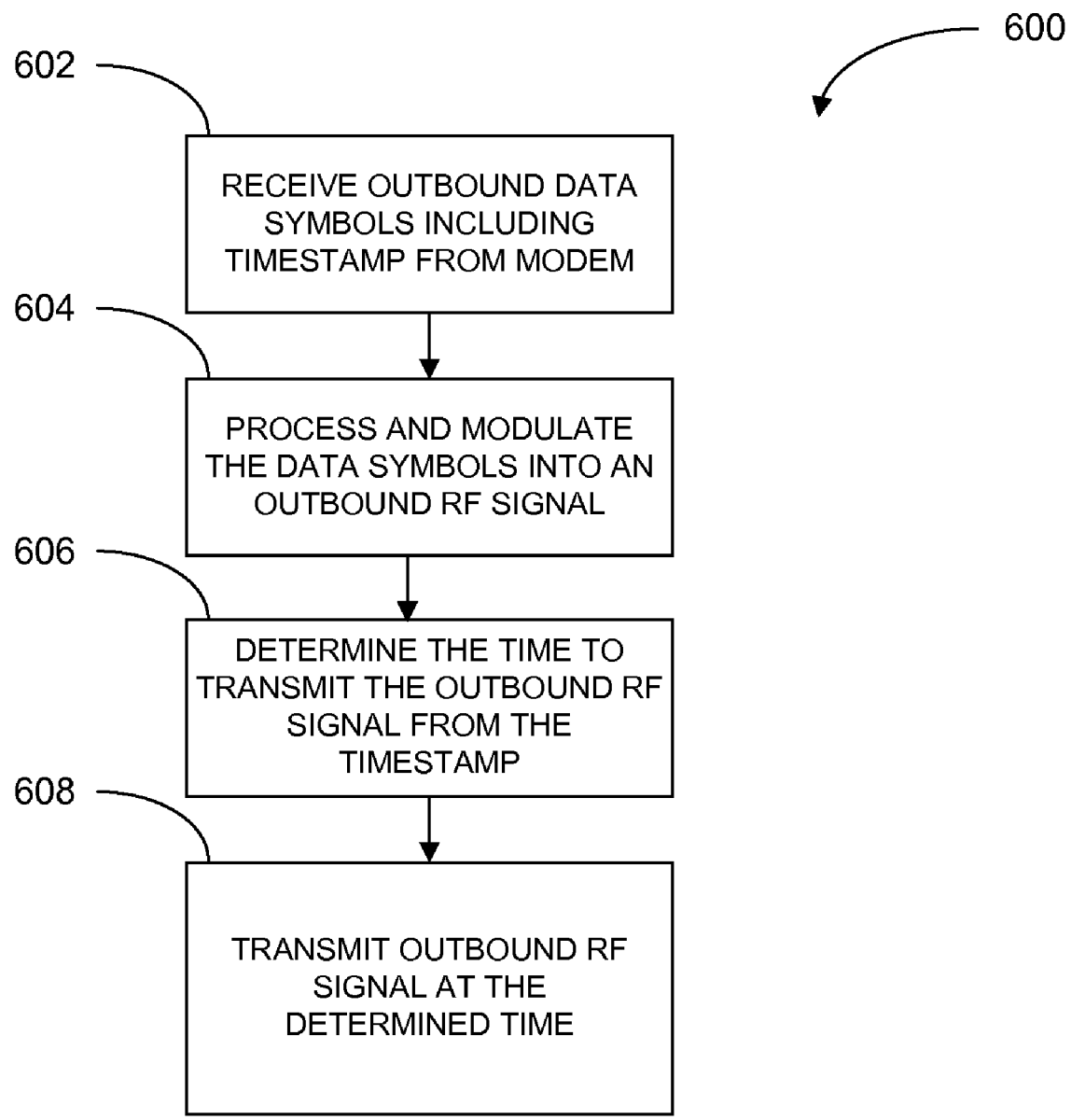
FIG. 6 illustrates a flow diagram of an exemplary method of processing an outbound signal in accordance with another embodiment of the disclosure.

FIG. 6 illustrates a flow diagram of an exemplary method 600 of processing an outbound signal in accordance with another embodiment of the disclosure. The method 600 may be implemented by the RF unit 304 previously discussed. According to the method 600, the RF unit 304 receives the packetized outbound symbols including a corresponding timestamp from the modem 302 (block 602). The RF unit 304 then processes and modulates the data symbols to form an outbound RF signal (block 604). The RF unit 304 also determines the time to transmit the outbound RF signal from the timestamp received from the modem (block 606). The RF unit 304 then transmits the outbound RF signal via the transmit antenna 310 based on the determined time and clock signal from the clock generator 306 (block 608).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for communicating data, comprising:
a radio frequency (RF) unit adapted to:
   receive an inbound RF signal;
   generate samples from the inbound RF signal;
   packetize the samples generated from the inbound RF signal;
   generate a first timestamp related to a time at which the inbound RF signal was received;
   packetize the first timestamp; and
   combine the packetized samples with the packetized first timestamp to generate a packet stream; and
a modem adapted to:
   receive the packet stream from the RF unit.

2. The apparatus of claim 1,
wherein said packet stream generated by the RF unit includes data packets interleaved with timestamp packets; and
wherein the RF unit is adapted to combine the packetized samples with the packetized first timestamp by multiplexing the packetized samples with the packetized first timestamp.

3. The apparatus of claim 1, wherein said first timestamp provides information on an absolute time at which a data packet arrived; and
wherein said modem is coupled to said RF unit and said modem is further adapted to:
   process the packetized samples to generate received data.

4. The apparatus of claim 1, wherein the RF unit is adapted to generate the samples from the inbound RF signal by demodulating and processing the inbound RF signal.

5. The apparatus of claim 1, further comprising a clock signal generator adapted to generate a clock signal, wherein the RF unit is adapted to generate the first timestamp from the clock signal.

6. The apparatus of claim 5, wherein the clock signal is based on one or more signals received from one or more global positioning satellites (GPS).

7. The apparatus of claim 1, wherein the modem is further adapted to:
   generate a plurality of symbols from outbound data;

generate a second timestamp indicating a time at which transmission of the symbols is to start; and
combine the symbols with the second timestamp.

8. The apparatus of claim 7, wherein the RF unit is further adapted to:
receive, in a data stream received from the modem, the symbols and the second timestamp from the modem, said second timestamp preceding the symbols in said data stream received from the modem;
generate an outbound RF signal from the symbols; and
transmit the outbound RF signal at a time based on the second timestamp.

9. The apparatus of claim 8, further comprising a clock signal generator adapted to generate a clock signal, and wherein the RF unit is further adapted to transmit the outbound signal based on the clock signal.

10. The apparatus of claim 9, wherein the clock signal is based on one or more signals received from one or more global positioning satellites (GPS).

11. The apparatus of claim 8, wherein the RF unit is adapted to generate the outbound RF signal from the symbols by processing and modulating the symbols.

12. The apparatus of claim 7, wherein the modem is adapted to combine the symbols with the second timestamp by multiplexing the symbols with the second timestamp.

13. The apparatus of claim 7, wherein the modem is adapted to combine the symbols with the second timestamp by:
packetizing the symbols;
packetizing the second timestamp; and
time multiplexing the packetized symbols with the packetized second timestamp.

14. The apparatus of claim 7, wherein the second timestamp has a predetermined timing relationship with the first timestamp.

15. The apparatus of claim 7, wherein the outbound data is responsive to the inbound data.

16. A method of communicating data, comprising:
receiving an inbound RF signal at a radio frequency (RF) unit;
generating samples from the inbound RF signal;
packetizing the samples generated from the inbound RF signal;
generating a first timestamp related to a time at which the inbound RF signal was received;
packetizing the first timestamp;
combining the packetized samples with the packetized first timestamp to generate a packet stream; and
sending the samples with the first timestamp to a modem.

17. The method of claim 16,
wherein said packet stream includes data packets interleaved with timestamp packets; and
wherein combining the samples with the first timestamp to generate a packet stream comprises:
time multiplexing the packetized samples with the packetized first timestamp.

18. The method of claim 16, further comprising generating the first timestamp based on a clock signal.

19. The method of claim 18, wherein the clock signal is based on one or more signals received from one or more global positioning satellites (GPS).

20. The method of claim 16, further comprising:
receiving symbols and a second timestamp from the modem, said second timestamp indicating a time at which transmission of the symbols is to start;
generating an outbound RF signal from the symbols; and
transmitting the outbound RF signal at a time based on the second timestamp.

21. The method of claim 20, wherein the time of transmitting the outbound RF signal is based on a clock signal.

22. The method of claim 21, wherein the clock signal is based on one or more signals received from one or more global positioning satellites (GPS).

23. The method of claim 20, wherein receiving the symbols and the second timestamp from the modem comprises receiving packetized symbols time multiplexed with packetized second timestamp.

24. The method of claim 20, wherein the second timestamp has a predetermined timing relationship with the first timestamp.

25. An apparatus for communicating data, comprising:
means for receiving an inbound RF signal;
means for generating samples from the inbound RF signal;
means for packetizing the samples;
means for generating a first timestamp related to a time at which the inbound RF signal was received;
means for packetizing the first timestamp;
means for combining the packetized samples with the packetized first timestamp to generate a packet stream; and
means for sending the packet stream to a modem.

26. The apparatus of claim 25,
wherein said packet stream includes data packets interleaved with timestamp packets; and
wherein said means for combining the packetized samples with the packetized first timestamp comprises:
means for time multiplexing the packetized samples with the packetized first timestamp.

27. The apparatus of claim 25, further comprising:
means for receiving symbols and a second timestamp from the modem, said second timestamp indicating a time at which transmission of the symbols is to start;
means for generating an outbound RF signal from the symbols; and
means for transmitting the outbound RF signal at a time based on the second timestamp.

28. The apparatus of claim 27, wherein means for receiving the symbols and the second timestamp from the modem comprises means for receiving packetized symbols time multiplexed with a packetized second timestamp.

29. The apparatus of claim 28, wherein the second timestamp has a predetermined timing relationship with the first timestamp.

30. A non-transitory computer readable medium including one or more software modules adapted to:
receive an inbound RF signal;
generate samples from the inbound RF signal;
packetize the samples generated from the inbound RF signal;
generate a first timestamp related to a time at which the inbound RF signal was received;
packetize the first timestamp;
combine the packetized samples with the packetized first timestamp to generate a packet stream; and
send the packet stream to a modem.

31. The non-transitory computer readable medium of claim 30, wherein the one or more software modules are further adapted to:
receive packetized symbols and a packetized second timestamp from the modem;
generate an outbound RF signal from the packetized symbols; and transmit the outbound RF signal at a time based on the packetized second timestamp.

32. The apparatus of claim 1, wherein said first timestamp indicates a time at which one of the packetized samples was received, said one of the packetized samples not being the first sample in said packetized samples.

33. The apparatus of claim 1,
wherein the modem is further adapted to:
generate a plurality of symbols from outbound data;
generate a second timestamp indicating a time at which transmission of the symbols is to start; and
wherein the RF unit is further adapted to:
receive from the modem, in a data stream, the symbols and the second timestamp;
generate an outbound RF signal from the symbols; and
transmit the outbound RF signal at a time based on the second timestamp.

34. The method of claim 16, further comprising:
operating said modem to:
generate a plurality of symbols from outbound data;
generate a second timestamp indicating a time at which transmission of the symbols is to start; and
operating said RF unit to:
receive, from the modem, in a data stream, the symbols and the second timestamp;
generate an outbound RF signal from the symbols; and
transmit the outbound RF signal at a time based on the second timestamp.

35. The apparatus of claim 25, further comprising:
means for generating a plurality of symbols from outbound data;
means for generating a second timestamp indicating a time at which transmission of the symbols is to start;
means for receiving from the modem, in a data stream, the symbols and the second timestamp;
means for generating an outbound RF signal from the symbols; and
means for transmitting the outbound RF signal at a time based on the second timestamp.

36. The non-transitory computer readable medium of claim 30, wherein
the one or more software modules are further adapted to:
generate a plurality of symbols from outbound data;
generate a second timestamp indicating a time at which transmission of the symbols is to start;
receive from the modem, in a data stream, the symbols and the second timestamp;
generate an outbound RF signal from the symbols; and
transmit the outbound RF signal at a time based on the second timestamp.

37. The apparatus of claim 1, wherein said apparatus is a base station.

38. The method of claim 16, wherein said method is implemented by a base station.

39. The apparatus of claim 25, wherein said apparatus is a base station.

40. The non-transitory computer readable medium of claim 30, wherein said non-transitory computer readable medium is used in a base station.

* * * * *